(12) United States Patent
Loebel et al.

(10) Patent No.: US 7,939,587 B2
(45) Date of Patent: May 10, 2011

(54) PIGMENT PREPARATIONS COMPRISING POLYISOBUTENE DERIVATIVES AND NONIONIC SURFACE-ACTIVE ADDITIVES

(75) Inventors: Johannes Loebel, Mannheim (DE); Peter Madla, Moerstadt (DE); Jacques Mercy, Mannheim (DE); Claudia Sierakowski, Seeheim-Jugenheim (DE)

(73) Assignee: BASF SE, Ludwigshafen (DE)

( * ) Notice: Subject to any disclaimer, the term of this patent is extended or adjusted under 35 U.S.C. 154(b) by 59 days.

(21) Appl. No.: 12/438,615

(22) PCT Filed: Aug. 8, 2007

(86) PCT No.: PCT/EP2007/058220
§ 371 (c)(1),
(2), (4) Date: Feb. 24, 2009

(87) PCT Pub. No.: WO2008/022923
PCT Pub. Date: Feb. 28, 2008

(65) Prior Publication Data
US 2010/0016483 A1    Jan. 21, 2010

(30) Foreign Application Priority Data
Aug. 25, 2006 (EP) ................................... 06119519

(51) Int. Cl.
*C08K 5/34* (2006.01)
*C08G 67/02* (2006.01)

(52) U.S. Cl. ........................................ 524/104; 524/612

(58) Field of Classification Search ................... 524/104
See application file for complete search history.

(56) References Cited

U.S. PATENT DOCUMENTS

| 4,481,125 | A | 11/1984 | Holgado |
| 5,034,508 | A | 7/1991 | Nishizaki et al. |
| 5,798,147 | A | 8/1998 | Beck et al. |
| 6,540,825 | B1 * | 4/2003 | Quinn et al. ................. 106/476 |
| 2009/0039543 | A1 * | 2/2009 | Sierakowski et al. .... 264/211.12 |

FOREIGN PATENT DOCUMENTS

| DE | 29 14 086 | 9/1980 |
| DE | 39 13 667 | 1/1991 |
| EP | 0 359 034 | 3/1990 |
| EP | 0 628 612 | 12/1994 |
| JP | 8 217986 | 8/1996 |
| WO | 87 05924 | 10/1987 |
| WO | WO 8705924 A1 * | 10/1987 |
| WO | 2006 050968 | 5/2006 |

OTHER PUBLICATIONS

Hays, B. G., "Surface Treatment of Organic Pigments for Printing Ink Applications", American Ink Maker, vol. 62, No. 6, Total 8 pages, XP-009045503 (1984).

* cited by examiner

*Primary Examiner* — Ling-Siu Choi
*Assistant Examiner* — Hui Chin
(74) *Attorney, Agent, or Firm* — Oblon, Spivak, McClelland, Maier & Neustadt, L.L.P.

(57) ABSTRACT

Solid pigment preparations comprise as essential constituents
(A) at least one organic pigment,
(B) at least one polyisobutene derivative having at least one nitrogenous end group
and
(C) at least one nonionic surface-active additive.

17 Claims, No Drawings

PIGMENT PREPARATIONS COMPRISING POLYISOBUTENE DERIVATIVES AND NONIONIC SURFACE-ACTIVE ADDITIVES

The present description concerns solid pigment preparations comprising as essential constituents
(A) at least one organic pigment,
(B) at least one polyisobutene derivative having at least one nitrogenous end group
and
(C) at least one nonionic surface-active additive.

The present invention further concerns the production of these pigment preparations and their use for coloration of macromolecular organic materials of natural and synthetic origin.

Dispersing pigments in liquid application media requires the application of mechanical forces whose magnitude depends on pigment wettability and pigment affinity for the application medium. Dispersing is typically facilitated by utilizing dispersants which are said simultaneously also to prevent reagglomeration of pigment particles and flocculum formation and to additionally stabilize the pigment dispersion obtained.

WO-A-87/05924 discloses using polyisobutene derivatives to disperse pigments in hydrocarbon-based solvent systems and also to coat pigments. The pigments described in detail are inorganic pigments, phthalocyanine pigments and azo pigments.

DE-A-39 13 667 describes solid pigment preparations based on copper phthalocyanine pigments, comprising as well as sulfonated pigment derivatives bisamides of polyisobutenylsuccinic acid as dispersants and useful for producing printing inks exhibiting good flow behavior.

EP-A-628 612 discloses the use of the reaction products of polyisobutenylsuccinic anhydrides and alkanolamines for producing aqueous and nonaqueous dispersions of carbon black.

WO-A-2006/050968 describes offset printing inks based on unlaked azo pigments and comprising polyisobutene derivatives having nitrogenous end groups as flow improvers.

It is an object of the present invention to provide solid pigment preparations having advantageous performance characteristics, in particular with regard to their dispersibility and their rheological and coloristic properties.

We have found that this object is achieved by solid pigment preparations comprising as essential constituents
(A) at least one organic pigment,
(B) at least one polyisobutene derivative having at least one nitrogenous end group
and
(C) at least one nonionic surface-active additive.

Component (A) of the pigment preparations of the present invention comprises organic pigments. Preferably, component (A) comprises one organic pigment (A). Particularly preferred pigments (A) are phthalocyanine pigments and particularly isoindoline pigments with yellow isoindoline pigments, in particular C.I. Pigment Yellow 139 and C.I. Pigment Yellow 185, being very particularly preferred.

The pigment preparations of the present invention may comprise mixtures of various organic or various inorganic pigments or mixtures of organic and inorganic pigments. Preferably, however, they are based on one pigment (A), in particular on one organic pigment (A). These preferred pigment preparations of the present invention can therefore also be referred to as pigments coated with polyisobutene derivatives (B) and nonionic surface-active additives (C).

The pigments (A) are present in finely divided form. Accordingly, their typical average particle size is in the range from 0.01 to 5 μm.

When the as-synthesized pigment already has the desired particle form, it can be used directly as pigment (A). Otherwise, the crude pigment obtained has to be subjected to an additional pigment-finishing step.

Component (B) of the pigment preparations of the present invention comprises polyisobutene derivatives having at least one nitrogenous end group.

The polyisobutene radical of component (B) may have a linear, branched or star-shaped construction and comprise one or more nitrogenous end groups. Conversely, one or more polyisobutene groups may be attached to one nitrogenous end group. Component (B) preferably comprises a polyisobutene derivative having one nitrogenous end group per polyisobutene group.

The polyisobutene radical may be constructed of isobutene units only or else comprise comonomers whose proportion is generally $\leq 20\%$ by weight, preferably $\leq 10\%$ by weight and more preferably $\leq 5\%$ by weight. Examples of such comonomers are for example vinylaromatics, such as styrene and $C_1$-$C_4$-alkylstyrenes, such as 2-, 3- and 4-methylstyrene and 4-tert-butylstyrene, isoolefins having 5 to 10 carbon atoms, such as 2-methyl-1-butene, 2-methyl-1-pentene, 2-methyl-1-hexene, 2-ethyl-1-pentene, 2-ethyl-1-hexene and 2-propyl-1-heptene, and 1-butene and cis- and trans-2-butene. Such comonomers may be present in technical grade isobutene.

The average molecular weight $M_n$ of the polyisobutene radical of component (B) is generally in the range from 150 to 10 000, preferably in the range from 200 to 6000, more preferably in the range from 300 to 4000 and most preferably in the range from 400 to 3000.

The nitrogenous end groups of the polyisobutene derivatives (B) may comprise one or more, in particular 1 to 10, nitrogen atoms. The nitrogen atoms are preferably in the form of primary, secondary and/or tertiary amino groups, but they may also be incorporated as amide groups in the end groups. The nitrogenous end groups are more preferably derived from straight-chain or branched polyalkylenepolyamines. The nitrogenous end groups may also comprise further functional groups, in particular oxygenous functional groups, such as hydroxyl or ether groups, but preferably they are functionalized by amino groups only.

The reaction products of polyisobutenylsuccinic anhydrides (PIBSAs) with ammonia or in particular amines are particularly preferred polyisobutene derivatives (B).

The polyisobutenylsuccinic anhydrides serving as starting materials for these components (B) are obtainable by reaction of high-reactivity polyisobutenes, i.e., polyisobutenes comprising a particularly high proportion (preferably $\geq 85\%$) of α-olefin end groups, with maleic anhydride.

Of these PIBSA reaction products, particular preference is given to polyisobutenylsuccinimides (PIBSIs) of the formula I

I which are obtainable by reaction of PIBSA with ammonia or primary amines $H_2NR^1$ (in particular di- or polyamines).

In the formula, R corresponds to the polyisobutene radicals described above.

$R^1$ is hydrogen or preferably a hydrocarbyl radical which has a terminal amino group and may be aliphatic or aromatic.

More preferably, $R^1$ is an aliphatic hydrocarbyl radical having 1 to 60 carbon atoms, in particular 2 to 30 carbon atoms and especially 2 to 16 carbon atoms.

Examples of particularly suitable $R^1$ radicals are straight-chain or branched ω-aminoalkylene groups, such as ω-aminomethylene, ω-aminoethylene, ω-aminopropylene, ω-aminobutylene, ω-aminopentylene and ω-aminohexylene.

The carbon chain of very particularly suitable $R^1$ radicals is interrupted by one or more amino functions —$NR^2$—, where $R^2$ is $C_1$-$C_6$-alkyl and in particular hydrogen.

Such $R^1$ radicals have for example the following structure:

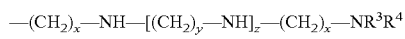
—$(CH_2)_x$—NH—[$(CH_2)_y$—NH]$_z$—$(CH_2)_x$—$NR^3R^4$ where x and y are independently from 1 to 6, preferably from 2 to 4 and more preferably 2 or 3, z is from 0 to 8 and $R^3$ and $R^4$ are independently hydrogen or $C_1$-$C_6$-alkyl, preferably hydrogen or methyl and more preferably hydrogen.

Particularly preferred $R^1$ radicals are derived from polyalkylenepolyamines, in particular polyethylenepolyamines and polyethyleneimines.

Examples of particularly suitable low molecular weight polyfunctional amino radicals $R^1$ include the radicals derived from the following amines: diethylenetriamine, triethylenetetramine and pentaethylenetetramine.

An example of a very particularly preferred $R^1$ radical is

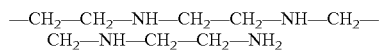
—$CH_2$—$CH_2$—NH—$CH_2$—$CH_2$—NH—$CH_2$—
$CH_2$—NH—$CH_2$—$CH_2$—$NH_2$ The $R^1$ radicals may additionally comprise further functional groups, in particular hydroxyl and/or ether groups. Preferably, however, they are functionalized by amino groups only.

It will be appreciated that mixtures of various polyisobutylenesuccinimides I or mixtures of the polyisobutylenesuccinimides I with further nitrogenous polyisobutylene derivatives can also be used as component (B).

Reaction products of PIBSA with an amine which are useful as component (B) further include the hereinbelow recited compounds, which can be specifically prepared by varying the reaction conditions, but may also be present as by-products in the polyisobutylenesuccinimides I:

polyisobutylenesuccinamic acids of the formula II

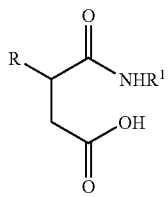

II which are formed as an intermediate even in the equimolar reaction of PIBSA with primary amines to form the polyisobutylenesuccinimides I, polyisobutylenesuccinamides of the formula III

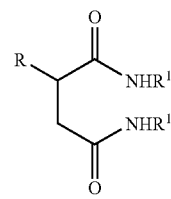

III which are formed as main products in the reaction of PIBSA with twice the molar amount of amine (primary or even secondary amines), and also disuccinimides of the formula IV

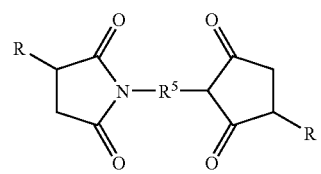

IV where $R^5$ is a radical derived from the $R^2$ radicals and incorporated in the second succinimide ring via an amino group.

Useful polyisobutene derivatives (B) further include Mannich adducts, obtained by reaction of polyisobutenylphenols with formaldehyde or a formaldehyde oligomer or polymer and at least monofunctional primary or secondary amines.

Preferably, however, the polyisobutenylsuccinimides I are present as component (B) in the pigment preparations of the present invention.

Details concerning the polyisobutene derivatives (B) and their formation are known from WO-A-2006/050968 and the references cited therein.

The pigment preparations of the present invention comprise nonionic surface-active additives as a further component (C).

The additives (C) are preferably based on polyethers (polyalkylene oxides).

As well as unmixed polyalkylene oxides, preferably $C_2$-$C_4$-alkylene oxides and phenyl-substituted $C_2$-$C_4$-alkylene oxides, especially polyethylene oxides, polypropylene oxides and poly(phenylethylene oxide)s, it is also block copolymers, especially polymers having polypropylene oxide and polyethylene oxide blocks or poly(phenylethylene oxide) and polyethylene oxide blocks, and also random copolymers of these alkylene oxides which are suitable for use as additive (C).

These polyalkylene oxides are obtainable by polyaddition of alkylene oxides onto starter molecules such as saturated or unsaturated aliphatic and aromatic alcohols, saturated or unsaturated aliphatic and aromatic amines, saturated or unsaturated aliphatic carboxylic acids and carboxamides and also aromatic carboxamides and sulfonamides. Aromatic starter molecules may be substituted by $C_1$-$C_{20}$-alkyl or $C_7$-$C_{30}$-aralkyl. It is customary to use from 1 to 300 mol and preferably from 3 to 150 mol of alkylene oxide per mol of starter molecule, although in the case of aromatic starter molecules the amounts of alkylene oxide are in particular in the range from 2 to 100 mol, preferably in the range from 5 to 50 mol and especially in the range from 10 to 30 mol. The polyaddition products may have a terminal OH group or be end group capped, being in the form of $C_1$-$C_6$-alkyl ethers for example.

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptyl-undecanol, 2-octyldecanol, 2-nonyltridecanol, 2-decyltetradecanol, oleyl alcohol and 9-octadecenol and also mixtures of these alcohols, such as $C_8/C_{10}$, $C_{13}/C_{15}$ and $C_{16}/C_{18}$ alcohols, and cyclopentanol and cyclohexanol. Of particular interest are the saturated and unsaturated fatty alcohols obtained from natural raw materials by lipolysis and reduction and the synthetic fatty alcohols from the oxo process preferably from 200 to 1000 s. The alkylene oxide adducts with these alcohols typically have average molecular weights $M_n$ from 200 to 5000, preferably from 200 to 1000.

Examples of the abovementioned aromatic alcohols include not only unsubstituted phenol and α- and β-naphthol but also the alkyl-substituted products, which are substituted in particular by $C_1$-$C_{12}$-alkyl, preferably $C_4$-$C_{12}$-alkyl or $C_1$-$C_4$-alkyl, and the aralkyl-substituted products, in particular $C_7$-$C_{30}$-aralkyl-substituted phenol, such as hexylphenol, heptylphenol, octylphenol, nonylphenol, isononylphenol, undecylphenol, dodecylphenol, di- and tributylphenol and dinonylphenol, and also bisphenol A and its reaction products with styrene, in particular bisphenol A substituted by a total of 4 phenyl-1-ethyl radicals in the ortho positions to the two OH groups.

Suitable aliphatic amines correspond to the abovementioned aliphatic alcohols. Again of particular importance here are the saturated and unsaturated fatty amines which preferably have from 14 to 20 carbon atoms. Examples of aromatic amines are aniline and its derivatives.

Useful aliphatic carboxylic acids include especially saturated and unsaturated fatty acids which preferably comprise from 14 to 20 carbon atoms.

Suitable carboxamides are derived from these carboxylic acids.

As well as alkylene oxide adducts with monofunctional amines and alcohols it is also alkylene oxide adducts with at least bifunctional amines and alcohols which can be used as additive (C).

The at least bifunctional amines preferably have from 2 to 5 amine groups and conform in particular to the formula $H_2N$—$(R^6$—$NR^7)_n$—$H$($R^6$: $C_2$-$C_6$-alkylene; $R^7$: hydrogen or $C_1$-$C_6$-alkyl; n: 1-5). Specific examples are: ethylenediamine, diethylenetriamine, triethylene-tetramine, tetraethylenepentamine, 1,3-propylenediamine, dipropylenetriamine, 3-amino-1-ethyleneaminopropane, hexamethylenediamine, dihexamethylenetriamine, 1,6-bis(3-aminopropylamino) hexane and N-methyldipropylenetriamine, of which hexamethylenediamine and diethylenetriamine are more preferable and ethylenediamine is most preferable.

The average molecular weights $M_n$ of the block copolymers based on polyfunctional amines are generally in the range from 1000 to 40 000 and preferably in the range from 1500 to 30 000.

The at least bifunctional alcohols preferably have from two to five alcohol groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

The average molecular weights $M_n$ of the block copolymers based on polyhydric alcohols are generally in the range from 1 000 to 20 000 and preferably in the range from 1000 to 15 000.

Preferred additives (C) are the alkylene oxide adducts, in particular the ethylene oxide adducts, with alcohols or amines.

The alcohols or amines used as a starter molecule comprise in particular natural or synthetic fatty alcohols or fatty amines. Preference of these is given to short-chain synthetic fatty alcohols (oxo process alcohols) having 8 to 18 carbon atoms.

Particularly preferred additives (C) based on these fatty alcohols comprise in general from 3 to 11 mol and in particular from 3 to 6 mol of ethylene oxide per mol of alcohol.

It will be appreciated that mixtures of various nonionic surface-active additives can also be used as component (C).

The pigment preparations of the present invention comprise in general from 60% to 99% by weight and in particular from 75% to 98.5% by weight of pigment (A), from 0.5 to 20% by weight and preferably from 1% to 10% by weight of polyisobutene derivative (B) and from 0.5% to 20% by weight and in particular from 0.5% to 15% by weight of surface-active additive (C).

The pigment preparations of the present invention are advantageously obtainable by the process which is likewise of the present invention, by contacting the as-synthesized crude pigment (A) in an aqueous medium with said polyisobutene derivative (B) and said surface-active additive (C) and the (B)- and (C)-coated pigment being isolated and dried.

The as-synthesized crude pigment typically does not have a form suitable for use and so typically has to be additionally subjected to a finishing operation to adjust it to the desired particle shape and size.

This finishing operation in accordance with the present invention can be carried out in the presence of the polyisobutene derivative (B) and of the surface-active additive (C); that is, (B) and (C) can be added before or during this operation. It is similarly possible, however, to effect the coating of the pigment with (B) and (C) subsequently to the finishing step.

The finishing step operation typically comprises a crystallization process which, if desired, can be combined with a prior comminuting step (wet or dry grinding) of the crude pigment.

The crystallization process consists typically in a thermal treatment of the crude pigment in an aqueous, aqueous-organic or organic medium.

When the present invention's coating of pigment (A) with (B) and (C) is carried out as a separate step following pigment synthesis or pigment finishing, it can likewise be carried out in an aqueous, aqueous-organic or organic medium. Advantageously, it is carried out in an aqueous medium or else in an aqueous-organic medium comprising at least 50% by weight of water, using the pigment (A) which is generally present as a water-moist press cake.

Useful organic solvents for the pigment-coating step as well as for the pigment-finishing step include alcohols, etheralcohols, ethers, ketones, carboxamides and carboxylic esters and also mixtures thereof. The following examples may be mentioned in particular:
aliphatic and araliphatic, monohydric or polyhydric alcohols having up to 10 carbon atoms, such as methanol, ethanol, propanol, isopropanol, butanol, isobutanol, tert.-butanol, amyl alcohol, isoamyl alcohol, hexanol, isohexanol, heptanol, octanol, 2-ethylhexanol, ethylene glycol, 1,2-propylene glycol and 1,3-propylene glycol, cyclohexanol, methylcyclohexanol, benzyl alcohol and 2-phenylethanol;

mono- and di-$C_2$-$C_3$-alkylene glycol mono-$C_1$-$C_4$-alkyl ethers, such as ethylene glycol monomethyl ether, ethylene glycol monoethyl ether, ethylene glycol monobutyl ether, diethylene glycol monomethyl ether and diethylene glycol monoethyl ether;

acyclic and cyclic aliphatic ethers having up to 10 carbon atoms, such as dipropyl ether, diisopropyl ether, dibutyl ether, diisobutyl ether, tetrahydrofuran, dioxane, diethylene glycol dimethyl ether and diethylene glycol diethyl ether;

acyclic and cyclic aliphatic and araliphatic ketones having up to 10 carbon atoms, such as acetone, methyl ethyl ketone, methyl propyl ketone, methyl butyl ketone, diethyl ketone, methyl isopropyl ketone, methyl isobutyl ketone, cyclopentanone, cyclohexanone, methylcyclohexanone, acetophenone and propiophenone;

amides and $C_1$-$C_4$-alkylamides of aliphatic carboxylic acids having up to 4 carbon atoms, such as formamide, N,N-dimethylformamide, N,N-diethylformamide, N,N-dimethylacetamide, N,N-diethylacetamide, N,N-dimethylpropionamide, N,N-diethylpropionamide and N-methylpyrrolidone;

esters of aromatic carboxylic acids having altogether up to 12 carbon atoms, such as dimethyl phthalate and diethyl phthalate.

Preference is given to the use of solvents which are easy to remove at workup, for example by washing out with water, azeotropic distillation with water, steam distillation or by drying the total batch.

Glycols and their mono and dialkyl ethers are particularly preferred solvents.

The coating of pigment (A) with polyisobutene derivative (B) and surface-active additive (C) can be effected by dispersing the crude pigment in an aqueous or aqueous-organic medium or else by simply allowing it to dwell therein. Coating is preferably carried out in a stirred tank at 35-100° C., preferably 50-80° C.

The polyisobutene derivatives (B) are generally insoluble in water and therefore they are advantageously added in the form of emulsions in an aqueous-organic medium comprising said surface-active additive (C). Useful organic solvents here include for example hydrocarbons, such as isooctane, and alkylene glycol ethers, such as ethylene glycol monobutyl ether. The emulsion dissolves in the stirred tank, polyisobutene derivative (B) and to some extent the surface-active additive (C) as well precipitate, disperse very finely in the pigment suspension and so lead to a particularly uniform coating of pigment.

The (B)- and (C)-coated pigment (A) can be isolated by filterative removal, washing particularly with water and drying. Advantageously, the dried product is subjected to a deagglomerating grind in a rotary, gear or jet mill for example.

In the case of water-soluble additives (C), care must be taken to ensure that sufficient residual quantities (generally at least 0.5% by weight, based on the pigment preparation) remain in the isolated product. Alternatively, other methods can also be used for isolating the coated pigment, such as spray drying and freeze drying.

The pigment preparations of the present invention are very useful for coloration of macromolecular organic materials of natural and synthetic origin.

Examples of such materials include printing inks, in particular offset printing inks, coatings, in particular powder coatings, liquid inks, color filters, plastics and toners.

In this use, the pigment preparations of the present invention are notable for their advantageous dispersibility and their advantageous rheological and coloristic properties.

Their advantageous properties will now be illustratively described for individual applications.

The pigment preparations of the present invention provide offset printing inks having good performance characteristics (minimal tendency to bake on the printing roller and good flowability) in which the pigments are present in fine dispersion and which give prints of high transparency and high gloss.

When used in powder coatings, it is in particular the color strength as well as the advantageous dispersibility and advantageous plate-out control (i.e., minimal tendency to form pigment deposits on the surface of the medium to be coated and of the machines) which deserve highlighting.

On incorporation in plastics, the pigment preparations of the present invention are notable in particular for their color strength and their migration resistance.

EXAMPLES

A. Production of Inventive Pigment Preparations

A.1. Production of Microemulsions Comprising Polyisobutene Derivative (B) and Surface-Active Additive (C)

Polyisobutene derivative (B) was a polyisobutenylsuccinimide based on polyisobutene having an average molecular weight $M_n$ of 1000 and tetraethylenepentamine (polymer A of WO-A-2006/050968).

Emulsion 1:

14.6 g of polyisobutene derivative (B) were introduced into a heated mixture of 52.0 g of ethylene glycol monobutyl ether and 27.0 g of an ethoxylated isodecanol (3.5 mol of EO/mol) at 60° C., stirred for 10 min and admixed with 6.0 g of water. The emulsion obtained after homogenization was used directly for pigment coating.

Emulsion 2:

14.6 g of polyisobutene derivative (B) were dissolved in 22.0 g of isooctane by heating and admixed with 27.0 g of an ethoxylated isodecanol (5 mol of EO/mol) by stirring. The emulsion obtained after heating to 50° C. was used directly for pigment coating.

A.2. Production of Pigment Preparations

Example 1

100 g of a water-moist press cake of C.I. Pigment Yellow 185 (solids content about 50% by weight; prepared according to Example 1 of DE-A-29 14 086) were suspended in 500 ml for 1 h until a homogeneous suspension was obtained. Thereafter, 21.3 g of emulsion 1 were added dropwise over about 20 min. The mixture obtained was stirred at 60° C. for 1 h.

The coated pigment was then filtered off on a suction filter equipped with a filter paper and washed with 3 l of water (conductivity of water run-off<100 μS). The moist press cake was dried at 90° C. in a circulating air drying cabinet for 24 h and subsequently ground in a laboratory mill for deagglomeration.

47.8 g of yellow pigment powder were obtained.

Comparative Example V1

Example 1 was repeated except that emulsion 1 was replaced by a solution of 5.0 g of the polyisobutene derivative (B) in 10 ml of ethylene glycol monobutyl ether.

50 g of yellow pigment powder were obtained.

Comparative Example V2

Example 1 was repeated except that emulsion 1 was replaced by 7.4 g of the ethoxylated isodecanol (3.5 mol of EO/mol).

48 g of yellow pigment powder were obtained.

Example 2

In a pressure tank equipped with anchor stirrer, 113.3 g of barbituric acid and 72.3 g of formic acid were dissolved in 1000 l of water and stirred for 10 min. After addition of 64.6 g of diiminoisoindoline in 130 ml of methanol, the mixture was heated to 96° C. over 2 h and stirred under autogenous pressure (about 1.3 bar) for 2 h.

After cooling to about 65° C., the suspension was diluted with 320 ml of water and stirred at 65° C. for a further 30 min. The pigment obtained was filtered off and washed electrolyte-free with hot water (conductivity of water run-off<200 µS) and the press cake obtained (yield 540 g, solids content 27% by weight) was subjected to a pigment-finishing step.

To this end, 210 g of the press cake were suspended in 500 ml of water, heated to 98° C. over 2 h and stirred at 98° C. for 2 h. After cooling the suspension to about 80° C. by addition of 300 ml of water, the finished pigment was filtered off and washed electrolyte-free with hot water at 60° C. The press cake obtained (yield 230 g, solids content 24% by weight) was then converted into an inventive pigment preparation by using emulsion 2.

To this end, the press cake obtained was suspended in 500 ml of water and homogenized by stirring at 60° C. for 90 min. Thereafter, 11.8 g of emulsion 2 were added dropwise. The mixture obtained was stirred at 60° C. for 1 h.

The coated pigment was then filtered off on a suction filter equipped with a filter paper and washed with 3 l of water. The moist press cake was dried at 115° C. in a vacuum drying cabinet for 12 h and subsequently ground in a laboratory mill for deagglomeration.

57 g of yellow pigment powder were obtained.

B. Testing of Inventive Pigment Preparations in Offset Printing Inks

To test their performance characteristics in printing, the pigment preparations obtained were processed into offset printing inks.

To this end, 20 g of each pigment preparation were stirred into 80 g of an offset varnish (40% by weight of rosin-modified phenolic resin, 27% by weight of varnish grade linseed oil and 33% by weight of 300° C. mineral oil) and then predispersed at 50° C. with a dissolver (Dispermat®, from Getzmann; toothed disk diameter 3 cm, 12 000 rpm) for 20 min. The paste obtained was subsequently ground on an SDY 200 three-roll stand (from Bühler) temperature controlled to 35° C., in 3 passes at 10 bar contact pressure.

Coloristic properties (color strength (reported in terms of coloring equivalents) and also hue [°] and chroma C*) were determined in white reduction by wet drawdown (method A) and also in test printing (method B).

Method A:

To test coloristic properties in white reduction, 0.35 g of each colored paste was mixed with 10 g of a 40% by weight pigment content white paste on a JEL 25/53 pan grinder (from Engelsmann) by 4×35 revolutions, drawn down on white Iconorex cardboard using a 100 µm coating bar, and immediately evaluated colorimetrically.

Method B:

To test coloristic properties in actual, test printing, each colored paste was used on a test printer (from Prufbau) to print 4 cm wide strips with an ink add-on of 12.0 mg±0.4 mg (corresponds to about 1.5 g/m²) on APCO II/II paper (temperature setting 23° C., contact pressure 250 N/cm, metal full tone printing plate, grinding and inking time 30 s, speed 0.5 m/s). The printed strips were not later than 10 min after printing dried at 60° C. in a drying cabinet for 30 min and immediately thereafter evaluated colorimetrically.

Colorimetric evaluation (determination of hue [°] and chroma C*) of the wet drawdowns (method A) and also of the test prints (method B) was done using an X-Rite 968 spectrophotometer (from X-Rite) in conjunction with BCSWIN software after aligning the depth of shade to 1/9 standard depth of shade (method A) or 1/1 standard depth of shade (method B) in accordance with German standard specification DIN 6174 (D 65 standard illuminant, 100 standard observer).

Color strength was determined by assigning the FAE coloring equivalent value of 100 as standard to the wet drawdowns and test prints produced from similarly prepared, but uncoated pigments (to make respectively standard 1 and standard 2). FAE coloring equivalent values<100 signify a higher color strength than standard while FAE coloring equivalent values>100 accordingly denote a lower color strength.

Gloss was determined by measuring the test prints using a Multigloss gloss-measuring instrument (from Byk Gardner) at a measuring angle of 60°.

Transparency was determined by measuring the difference in the reflectance of a test print (1.5 g/m²) on black cardboard against a black background as a scattering delta E value (scattering DE evaluation to DIN 6174 versus ideal black). The smaller the difference and hence also the scattering delta E value, the less the background is hidden and the more transparent the print.

Dispersibility was assessed by investigating the particle fineness of grinds of the colored pastes, obtained on the three-roll stand described above after 1, 3 and 6 passes and a contact pressure of 10 bar. Assessment was done visually under an optical microscope on a scale from 1 (poor; agglomerates of >100 µm) to 7 (very good; agglomerates<5 µm).

Rheology was determined by determining yield limit, viscosity and thixotropy of the colored pastes using a Rotovisko rheometer (from Thermo Electron) at 25° C.

The results of these investigations are compiled in table 1 (coloristic properties) and table 2 (particle fineness and rheological properties). Also listed, for comparison, are those involving the respective uncoated pigment (standard 1 and standard 2) and also the V1 pigment, coated with the polyisobutene derivative (B) only, and the V2 pigment, coated with the surface-active additive (C) only.

TABLE 1

| Pigment preparation | FAE | | Hue [°] | | C* | | | Scatter |
|---|---|---|---|---|---|---|---|---|
| (example) | A | B | A | B | A | B | Gloss | DE |
| 1 | 114 | 97 | 98.5 | 93.9 | 56.8 | 112.7 | 81 | 18.4 |
| V1 | 97 | 86 | 98.1 | 93.8 | 58.2 | 112.8 | 63 | 17.7 |
| V2 | 99 | 88 | 98.4 | 93.6 | 57.7 | 113.9 | 82 | 17.6 |
| Standard 1 | 100 | 100 | 97.5 | 93.2 | 57.0 | 112.3 | 62 | 17.5 |
| 2 | 110 | 115 | 80.3 | 83.0 | 57.3 | 109.3 | 73 | 12.6 |
| Standard 2 | 100 | 100 | 79.9 | 81.4 | 58.0 | 115.2 | 74 | 12.8 |

TABLE 2

| Pigment preparation (example) | Particle fineness 1 pass | 3 passes | 6 passes | Yield limit [Pa] | Viscosity [Pa s] | Thixotropy [Pa/s] |
|---|---|---|---|---|---|---|
| 1 | 3-4 | 5-6 | 6 | 30 | 65 | 1400 |
| V1 | 4 | 4 | 4-5 | 31 | 140 | 10100 |
| V2 | 2-3 | 4-5 | 5-6 | 300 | 80 | 6200 |
| Standard 1 | 2 | 4 | 4 | 200 | 120 | 5000 |
| 2 | 6 | 6-7 | 6-7 | 35 | 65 | 2500 |
| Standard 2 | 3-4 | 5 | 5 | 140 | 85 | 4100 |

We claim:

1. A solid pigment preparation comprising
   (A) at least one organic pigment,
   (B) at least one polyisobutene having at least one nitrogenous end group, and
   (C) at least one nonionic surface-active additive,
   wherein said at least one nonionic surface-active additive is at least one polyalkylene oxide.

2. The pigment preparation according to claim 1 wherein said component (B) comprises a reaction product of a polyisobutenylsuccinic anhydride with ammonia or an amine.

3. The pigment preparation according to claim 1 wherein said component (B) comprises a reaction product of a polyisobutenylsuccinic anhydride with a polyamine.

4. The pigment preparation according to claim 1 wherein said polyalkylene oxide is obtained by polyaddition of an alkylene oxide onto an alcohol or an amine.

5. The pigment preparation according to claim 1 wherein said component (A) comprises an isoindoline pigment.

6. A process for producing a pigment preparation according to claim 1, which comprises
   contacting the as-synthesized crude pigment (A) in an aqueous medium with said component (B) and said surface-active additive (C) to coat said pigment,
   isolating the coated pigment, and
   drying the coated pigment.

7. The process according to claim 6 wherein said crude pigment (A) is additionally subjected to a pigment-finishing step and said compound (B) and said surface-active additive (C) are added before, during or after said pigment-finishing step.

8. The process according to claim 6 wherein said compound (B) is utilized in the form of an emulsion in an aqueous-organic medium comprising said surface-active additive (C).

9. The pigment preparation according to claim 1 wherein said component (A) is present in an amount of from 60% to 99% by weight of the total weight of said pigment preparation.

10. The pigment preparation according to claim 1 wherein said component (A) is present in an amount of from 75% to 98.5% by weight of the total weight of said pigment preparation.

11. The pigment preparation according to claim 1 wherein said component (B) is present in an amount of from 0.5% to 20% by weight of the total weight of said pigment preparation.

12. The pigment preparation according to claim 1 wherein said component (B) is present in an amount of from 1% to 10% by weight of the total weight of said pigment preparation.

13. The pigment preparation according to claim 1 wherein said component (C) is present in an amount of from 0.5% to 20% by weight of the total weight of said pigment preparation.

14. The pigment preparation according to claim 1 wherein said component (C) is present in an amount of from 0.5% to 15% by weight of the total weight of said pigment preparation.

15. The pigment preparation according to claim 1, wherein said at least one polyalkylene oxide is selected from the group consisting of a block copolymer of two or more alkylene oxides, a random copolymer of two or more alkylene oxides, and a homopolymer of one alkylene oxide.

16. The pigment preparation according to claim 15, wherein the at least one polyalkylene oxide is a homopolymer of one alkylene oxide, and said homopolymer is selected from the group consisting of polyethylene oxide, polypropylene oxide, and polyphenylethylene oxide.

17. The pigment preparation according to claim 15, wherein the at least one polyalkylene oxide is a block copolymer of two or more alkylene oxides, and said block copolymer comprises one or more blocks of polypropylene oxide and one or more blocks of polyethylene oxide, or said block copolymer comprises one or more blocks of polyphenylethylene oxide and one or more blocks of polyethylene oxide.

* * * * *